(12) United States Patent
Mandal et al.

(10) Patent No.: US 11,940,616 B2
(45) Date of Patent: Mar. 26, 2024

(54) SCALABLE METHOD OF FABRICATING STRUCTURED POLYMERS FOR PASSIVE DAYTIME RADIATIVE COOLING AND OTHER APPLICATIONS

(71) Applicant: THE TRUSTEES OF COLUMBIA UNIVERSITY IN THE CITY OF NEW YORK, New York, NY (US)

(72) Inventors: Jyotirmoy Mandal, Chittagong (BD); Yuan Yang, New York, NY (US); Nanfang Yu, Fort Lee, NJ (US)

(73) Assignee: The Trustees of Columbia University in the City of New York, New York, NY (US)

(*) Notice: Subject to any disclaimer, the term of this patent is extended or adjusted under 35 U.S.C. 154(b) by 436 days.

(21) Appl. No.: 16/770,256

(22) PCT Filed: Dec. 10, 2018

(86) PCT No.: PCT/US2018/064788
§ 371 (c)(1),
(2) Date: Jun. 5, 2020

(87) PCT Pub. No.: WO2019/113596
PCT Pub. Date: Jun. 13, 2019

(65) Prior Publication Data
US 2021/0165206 A1    Jun. 3, 2021

Related U.S. Application Data

(60) Provisional application No. 62/596,145, filed on Dec. 8, 2017.

(51) Int. Cl.
*G02B 26/00* (2006.01)
*C08J 9/28* (2006.01)
(Continued)

(52) U.S. Cl.
CPC ............ *G02B 26/004* (2013.01); *C08J 9/286* (2013.01); *C08K 5/0041* (2013.01); *C09D 5/004* (2013.01);
(Continued)

(58) Field of Classification Search
CPC ... B32B 2305/026; C08J 9/286; G02B 26/004
See application file for complete search history.

(56) References Cited

U.S. PATENT DOCUMENTS 4,411,495 A  *  10/1983  Beni ...................... G02F 1/195
                                                             349/91
5,764,316 A       6/1998  Takizawa et al.
(Continued)

FOREIGN PATENT DOCUMENTS

WO       2006068216 A1    6/2006

OTHER PUBLICATIONS

International Search Report and The Written Opinion of the International Searching Authority, International Application No. PCT/US2018/064788, dated Feb. 21, 2019.

*Primary Examiner* — Jonathan Y Jung
(74) *Attorney, Agent, or Firm* — Murtha Cullina LLP; Anthony P. Gangemi

(57) ABSTRACT

A switchable light transmission module is disclosed that includes a substrate having a first surface defining at least part of an enclosed volume, a porous layer disposed on the first surface and in fluid communication with the enclosed volume, and a reservoir in fluid communication with the enclosed volume. The reservoir is configured to supply a fluid to the sealed volume such that the fluid contacts the porous layer. The fluid has a refractive index that is close to the refractive index of the porous layer, has a high wettability for the porous layer, and does not dissolve the porous layer. When in a dry state, voids in the porous layer are filled
(Continued)

with air which has a much different refractive index than the porous layer itself, resulting in a surface that is reflective and not very transmissive. During wetting of the porous layer by the fluid, however, those voids are filled with the fluid, reducing the difference in refractive index across the polymer-fluid interfaces such that light scattering is negligible and the surface becomes light permeable.

20 Claims, 13 Drawing Sheets

(51) Int. Cl.
<table>
<tr><td>C08K 5/00</td><td>(2006.01)</td></tr>
<tr><td>C09D 5/33</td><td>(2006.01)</td></tr>
<tr><td>E04D 7/00</td><td>(2006.01)</td></tr>
<tr><td>E04D 13/00</td><td>(2006.01)</td></tr>
<tr><td>E04F 13/08</td><td>(2006.01)</td></tr>
<tr><td>E06B 9/24</td><td>(2006.01)</td></tr>
<tr><td>G02B 1/14</td><td>(2015.01)</td></tr>
<tr><td>G02B 5/20</td><td>(2006.01)</td></tr>
</table>

(52) U.S. Cl.
CPC ............... *E04D 7/00* (2013.01); *E04D 13/00* (2013.01); *E04F 13/08* (2013.01); *E06B 9/24* (2013.01); *G02B 1/14* (2015.01); *G02B 5/208* (2013.01); *B32B 2305/026* (2013.01); *C08J 2301/12* (2013.01); *C08J 2301/28* (2013.01); *C08J 2325/06* (2013.01); *C08J 2327/06* (2013.01); *C08J 2327/14* (2013.01); *C08J 2327/20* (2013.01); *C08J 2383/04* (2013.01); *E06B 2009/2411* (2013.01); *E06B 2009/2417* (2013.01)

(56) References Cited

U.S. PATENT DOCUMENTS

| | | | |
|---|---|---|---|
| 6,628,355 B1 | 9/2003 | Takahara | |
| 7,081,272 B2 | 7/2006 | Sasaki et al. | |
| 7,171,095 B2 | 1/2007 | Sugita et al. | |
| 2004/0069948 A1* | 4/2004 | Feisst | B82Y 20/00 |
| | | | 250/343 |
| 2004/0184158 A1* | 9/2004 | Shadduck | A61F 2/1635 |
| | | | 359/665 |
| 2007/0029256 A1* | 2/2007 | Nakano | B01D 71/68 |
| | | | 210/500.21 |
| 2007/0071971 A1* | 3/2007 | Drogan | B32B 7/06 |
| | | | 428/343 |
| 2011/0222295 A1 | 9/2011 | Weber et al. | |
| 2014/0268283 A1* | 9/2014 | Chandrasekhar | G02F 1/155 |
| | | | 205/188 |
| 2015/0277012 A1 | 10/2015 | Nakamura et al. | |
| 2015/0293347 A1* | 10/2015 | Kreit | G02B 26/005 |
| | | | 359/290 |
| 2018/0059690 A1* | 3/2018 | Coleman | B23P 11/00 |

* cited by examiner

SCALABLE METHOD OF FABRICATING STRUCTURED POLYMERS FOR PASSIVE DAYTIME RADIATIVE COOLING AND OTHER APPLICATIONS

CROSS REFERENCE TO RELATED APPLICATION(S)

This application is a national stage filing of International Patent Application No. PCT/US2018/064788, filed Dec. 10, 2018, which claims the benefit of U.S. Provisional Application No. 62/596,145, filed Dec. 8, 2017, which are incorporated by reference as if disclosed herein in their entirety.

"STATEMENT REGARDING FEDERALLY SPONSORED RESEARCH OR DEVELOPMENT

This invention was made with government support under 1420634, 1307948, and 1069240, awarded by the National Science Foundation; DE-ACO2-06CH11357 awarded by the Department of Energy; and FA9550-14-1-0389 and FA9550-16-1-0322, awarded by the United States Air Force/Air Force office of Science Research. The government has certain rights in the invention.

TECHNICAL FIELD

The present disclosure relates to the field of polymer layers and to the field of optically switching materials.

BACKGROUND

For a variety of reasons, including, e.g., cost and environmental impact, there are many ongoing efforts to reduce energy usage through building materials that possess beneficial solar reflectance and thermal emittance characteristics. Such materials, however, may not be aesthetically pleasing, may also be difficult and/or expensive to manufacture, and may not always have suitable solar reflectance or thermal emittance characteristics. Furthermore, their optical properties are static, which limits their use in buildings with variable weather. Accordingly, there is a long-felt need in the art for materials that possess beneficial switchable optical transmission of solar and thermal radiation.

SUMMARY

Some embodiments of the present disclosure are directed to a switchable light transmission module including a substrate having a first surface defining at least part of an enclosed volume, a porous layer disposed on the first surface and in fluid communication with the enclosed volume, and a reservoir in fluid communication with the enclosed volume and including a non-dissolving fluid. In some embodiments, the reservoir is configured to supply the fluid to the sealed volume such that the fluid contacts the porous layer. In some embodiments, the fluid has a refractive index that is within about 30% of the refractive index of the porous layer. In some embodiments, the fluid is chosen so as to have a high wettability for the porous layer and does not dissolve the porous layer. When in a dry state, voids in the porous layer are filled with air, which have much different refractive indices than the porous layer itself, resulting in a surface that is reflective and not very transmissive. During wetting of the porous layer by fluid, however, those voids are filled with the fluid, reducing the difference in refractive index across the polymer-fluid interfaces such that light scattering is negligible and the surface becomes light permeable.

In some embodiments, the switchable light transmission modules are incorporated into a fluid heating and cooling system including a substrate having a first light-permeable surface defining at least part of an enclosed volume, an opaque porous structured polymer layer disposed on the first surface and in fluid communication with the enclosed volume, and a reservoir in fluid communication with the enclosed volume and including a first fluid, the first fluid being able to wet but not dissolve the opaque porous structured polymer layer. In some embodiments, the fluid heating and cooling system includes a source of a second fluid in fluid communication with a cooling conduit and a heating conduit. In some embodiments, the cooling conduit is proximate to the opaque porous structured polymer layer for radiative cooling of the second fluid when the polymer layer is in a dry state. In some embodiments, the heating conduit is positioned to receive light transmitted through the substrate so when the polymer layer is in a wet state, light is incident on the second fluid and provides heat to the second fluid.

In some embodiments, the switchable light transmission modules include a substrate having a first surface defining at least part of an open volume exposed to the environment, and a hydrophilic porous, structured polymer layer disposed on the first surface and in fluid communication with water in the environment, such as rain, freshwater, seawater, etc.

In some embodiments, the switchable light transmission modules include structured polymers that are reflective or opaque to sunlight but transparent in the thermal wavelengths, and fluids that are absorptive or emissive in the thermal wavelengths.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
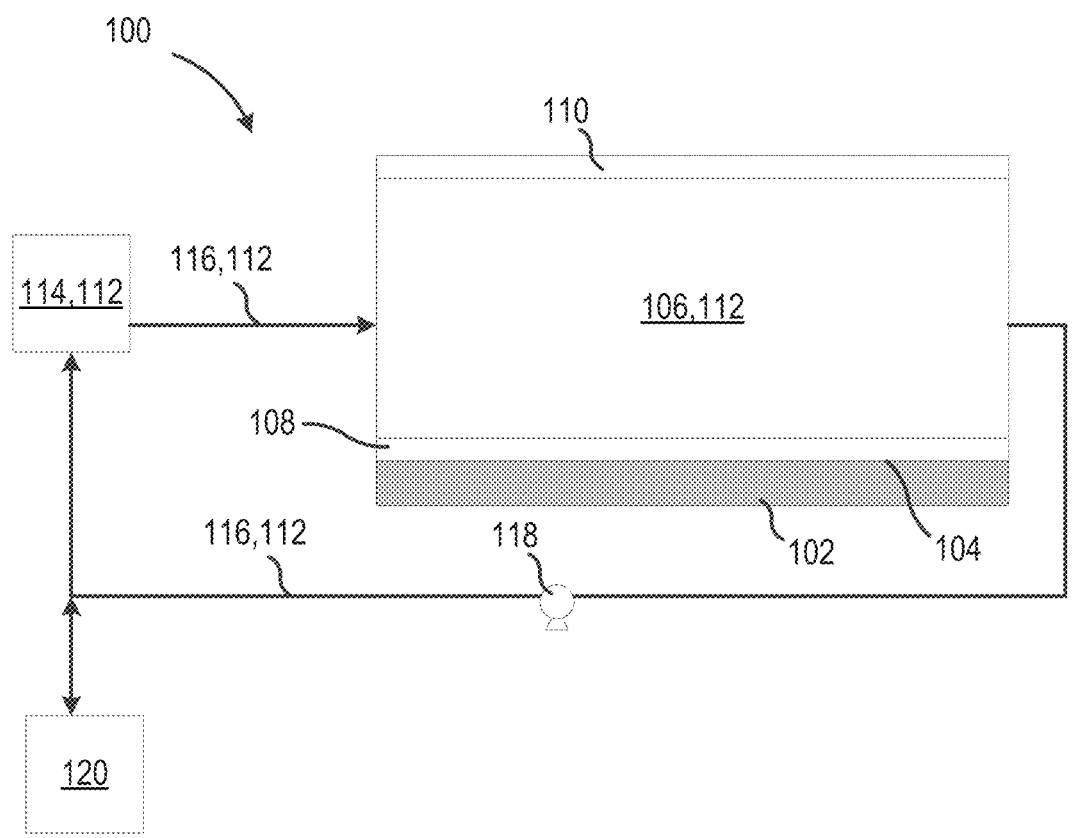
FIG. 1 is a schematic drawing of a switchable light transmission module according to some embodiments of the present disclosure.

Referring now to FIG. 1, some aspects of the disclosed subject matter include a switchable light transmission module 100 including a substrate 102 having a first surface 104 defining at least part of an enclosed volume 106. In some embodiments, substrate 102 includes building materials, glass, plastic, metal, textile, a window, a skylight, siding, roofing, decking, or combinations thereof, as will be discussed in greater detail below. In some embodiments, the substrate is light-permeable. In some embodiments, the substrate is flexible. In some embodiments, the substrate allows the movement of fluids through itself. In some embodiments, a porous layer 108 is disposed on first surface 104 and in fluid communication with enclosed volume 106. In some embodiments, substrate 102 has a color that is darker than the color of porous layer 108. In some embodiments, a cover 110 defines at least part of enclosed volume 106. In some embodiments, cover 110 provides partial enclosure to leave the volume 106 partially open to the environment. In some embodiments, cover 110 is light-permeable. In some embodiments, 110 cover is flexible. In some embodiments, the cover allows the movement of fluids through itself. In some embodiments, one or both of cover 110 and substrate 102 are translucent or transparent in at least one or more regions of the solar to thermal wavelengths (0.35 to 40 micrometers). In some embodiments, enclosed volume 106 is configured to retain a fluid 112, such as a liquid, a gas, e.g., air, or combinations thereof, as will be discussed in greater detail below.

Figure 2A:
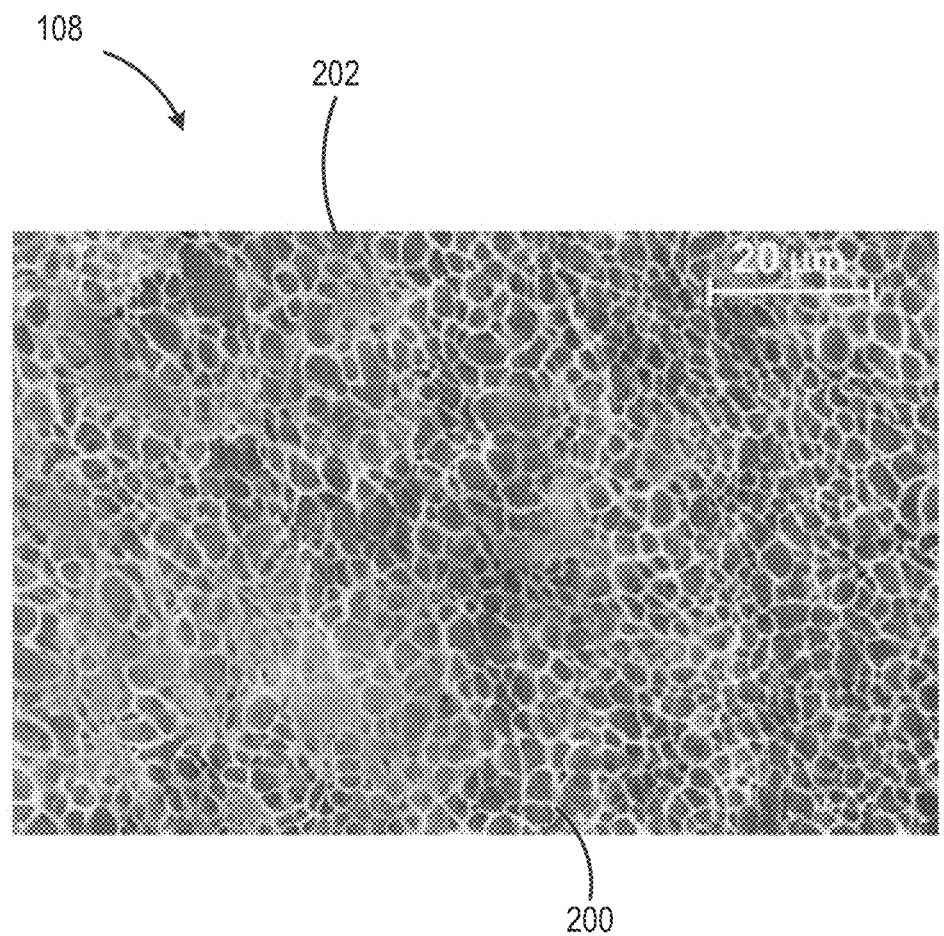
FIG. 2A is an image of a structured material according to some embodiments of the present disclosure.

Referring now to FIG. 2A, in some embodiments, porous layer 108 includes a structured polymer 200. In some embodiments, structured polymer 200 is a porous structured polymer layer including a plurality of voids 202. In some embodiments, structured polymer 200 is formed by a phase inversion process. In some embodiments, structured polymer 200 includes poly(vinylidene difluoride), poly(vinylidene difluoride-co-hexafluoropropene), poly(methyl methacrylate), poly(vinyl chloride), poly(vinyl fluoride), poly(styrene), poly(dimethyl siloxane), cellulose acetate, ethyl cellulose, poly(ethene), poly(propene), or combinations thereof. In some embodiments, structured polymer 200 has a thickness between 50 micrometers to 2 mm. In some embodiments, structured polymer 200 has a thickness between 200 micrometers to 400 micrometers. In some embodiments, voids 202 have cross-sectional dimensions of less than 2 micrometers. In some embodiments, voids 202 have cross-sectional dimensions between 20 nm to 700 nm. In some embodiments, voids 202 have cross-sectional dimensions between about 20 to about 700 nm, between about 30 to about 670 nm, between about 40 to about 630 nm, between about 60 to about 600 nm, between about 70 to about 580 nm, between about 70 to about 200 nm, between about 120 to about 550 nm, between about 150 to about 520 nm, between about 180 to about 490 nm, between about 200 to about 470 nm, between about 220 to about 440 nm, between about 250 to about 410 nm, between about 270 to about 380 nm, between about 290 to about 350 nm, between about 310 to about 340 nm, or about 330 nm. In some embodiments, voids 202 have cross-sectional dimensions between 3 micrometers to 20 micrometers. In some embodiments, voids 202 have cross-sectional dimensions between 5 micrometers to about 10 micrometers. In some embodiments, voids 202 have cross-sectional dimensions of about 5 μm, about 6 μm, about 7 μm, about 8 μm, about 9 μm, or about 10 μm. In some embodiments, voids 202 have cross-sectional dimensions of less than 2 micrometers and between 3 micrometers to 20 micrometers. Without wishing to be bound by theory, relatively smaller voids, e.g., less than about 2 micrometers in cross-section, more efficiently scatter smaller wavelengths of radiation while larger voids, e.g., from about 3 to about 20 micrometers more efficiently scatter larger wavelengths, so a structured polymer 200 including both the smaller and larger voids 202 should lead to a high reflectance for sunlight.

In some embodiments, structured polymer 200 has a high hemispherical reflectance of light in the solar wavelengths, i.e., between about 0.35 micrometers to about 2.5 micrometers. In some embodiments, the hemispherical reflectance of structured polymer 200 is from about 50% to about 99% in the solar wavelengths. In some embodiments, the hemispherical reflectance structured polymer 200 from about 78% to 95%, from about 81% to about 93%, from about 83% to about 90%, from about 85% to about 89%, or about 87% in the solar wavelengths. In some embodiments, structured polymer 200 also has a high hemispherical emittance in the thermal wavelengths, i.e., greater than about 7 micrometers. In some embodiments, the hemispherical thermal emittance of structured polymer 200 is at least about 75% for radiation having a wavelength from about 8 to about 13 micrometers or longer. In some embodiments, the hemispherical thermal emittance of structured polymer 200 is at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or even about 99% for radiation having a wavelength from about 8 to about 13 micrometers or longer. In some embodiments, structured polymer 200 has a hemispherical reflectance from about 50% to about 99% and a hemispherical thermal emittance of at least about 75%. In some embodiments, structured polymer 200 has a hemispherical reflectance from about 75% to about 99% and a hemispherical thermal emittance of at least about 75%.

Figure 2B:
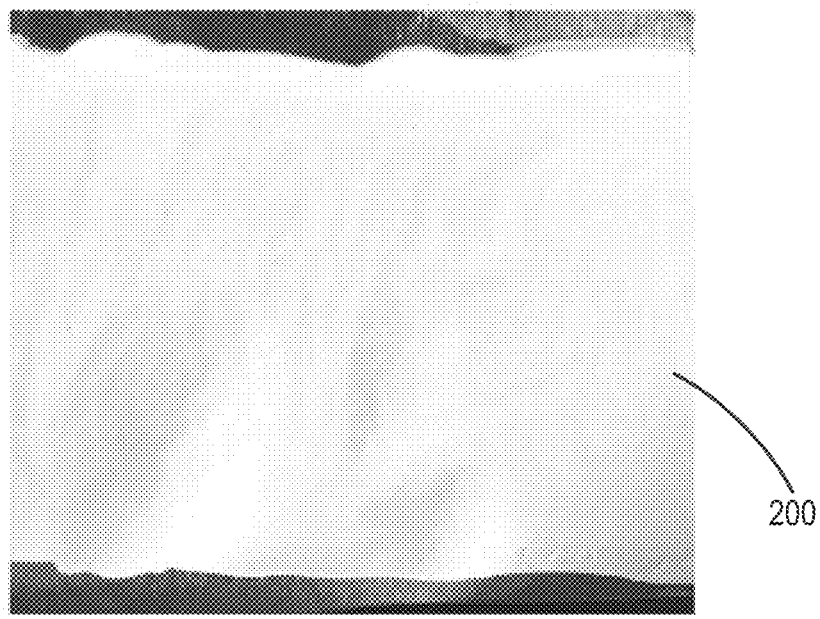
FIG. 2B is an image of a structured material according to some embodiments of the present disclosure.

Referring now to FIG. 2B, in some embodiments, structured polymer 200 has a bright white appearance under typical lighting conditions. In some embodiments, structured polymer 200 effectively scatters light ranging from the solar to thermal wavelengths. For example, in the solar wavelengths (e.g., 0.35-2.5 micrometers), where the polymer has negligible intrinsic absorption, this may result in back-scattering and high reflectivity, which can result in a white appearance of the film. At the same time, in the thermal wavelengths (e.g., 2.5-40 micrometers) where the polymer is intrinsically absorptive or emissive, this can lead to a high absorbance (black appearance) or emittance (glowing appearance) for the film. In some embodiments, the structure also introduces a refractive index gradient for longer thermal wavelengths, reducing the reflection of light and further enhancing the absorbance or emittance. In some embodiments, structured polymer 200 includes a colorant. In some embodiments, the colorant is a visible dye, infrared reflective dye, visible pigment, infrared reflective pigment, or combinations thereof. In some embodiments, the colorant is one or a combination of sudan blue, brilliant blue FCF, unisol blue, indigo carmine, sudan yellow, yellow 5, hansa yellow, and indium tin oxide. In some embodiments, the colorant absorbs only a desired wavelength of light, e.g., blue and green if red color is desired, or green and red if blue is desired, and not others. In some embodiments, the colorant does not absorb the infrared component of the solar wavelengths, i.e., 0.7 to 2.5 microns. In some embodiments, the colorant selectively reflects the infrared component of the solar wavelengths.

Referring again to FIG. 1, in some embodiments, switchable light transmission module 100 includes one or more reservoirs 114 in fluid communication with enclosed volume 106. In some embodiments, reservoir 114 is connected to enclosed volume 106 via one or more conduits 116. In some embodiments, reservoir 114 includes fluid 112. In some embodiments, reservoir 114 is configured to supply fluid 112 to enclosed volume 106. In some embodiments, supplying fluid 112 to enclosed volume 106 contacts and wets at least a portion of porous layer 108. In some embodiments, reservoir 114 is configured to receive fluid 112 back from enclosed volume 106. In some embodiments, switchable light transmission module 100 includes separate reservoirs 114 for supplying fluid 112 to and receiving fluid 112 from enclosed volume 106. In some embodiments, switchable light transmission module 100 includes one or more pumps 118 to move fluid 112 throughout switchable light transmission module 100. In some embodiments, switchable light transmission module 100 includes an condenser 120 to aid in recovery of fluid 112 removed from enclosed volume 106.

In some embodiments, fluid 112 wets, but does not dissolve, porous layer 108. In some embodiments, porous layer 108 is hydrophilic but insoluble in fluid 112, such as water. In some embodiments, the wetting of porous layer 108 by fluid 112 is reversible, e.g., by addition of heat, pressure, etc. In some embodiments, fluid 112 has a refractive index that is within about 30% of the refractive index of porous layer 108. In some embodiments, fluid 112 has a refractive index that is within about 15% of the refractive index of porous layer 108. In some embodiments, fluid 112 is emissive in the thermal wavelengths (2.5 to 40 micrometers). In some embodiments, fluid 112 is absorptive in the thermal wavelengths (2.5 to 40 micrometers) In some embodiments, fluid 112 is an alcohol. In some embodiments, fluid 112 is ethanol. In some embodiments, fluid 112 is isopropanol. In some embodiments, fluid 112 is glycerol. In some embodiments, fluid 112 is water or an aqueous solution. In some embodiments, fluid 112 is some combination of the above liquids.

Figure 3A:
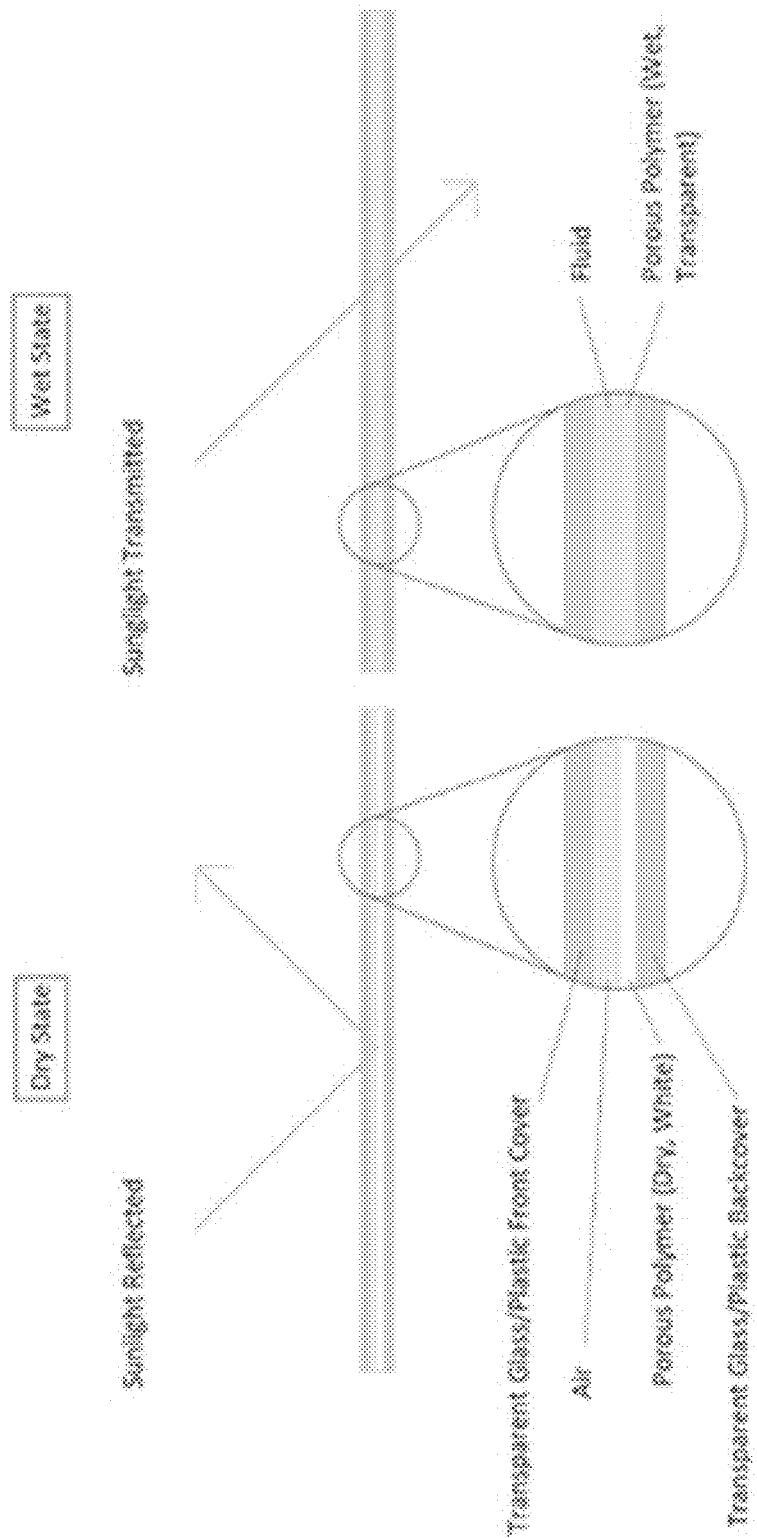
FIG. 3A is a schematic drawing of a switchable light transmission module according to some embodiments of the present disclosure.

Referring now to FIG. 3A, in some embodiments, fluid 112 is chosen so as to have a high wettability for porous layer 108, not dissolve porous layer 108, and have a refractive index in the solar wavelengths that is close to that of porous layer 108. In some embodiments, porous layer 108 has a refractive index above about 1.3. In some embodiments, porous layer 108 has a refractive index between about 1.4 to about 1.5. In some embodiments, in a dry state, porous layer 108 has a white or otherwise opaque in appearance.

Figure 3B:
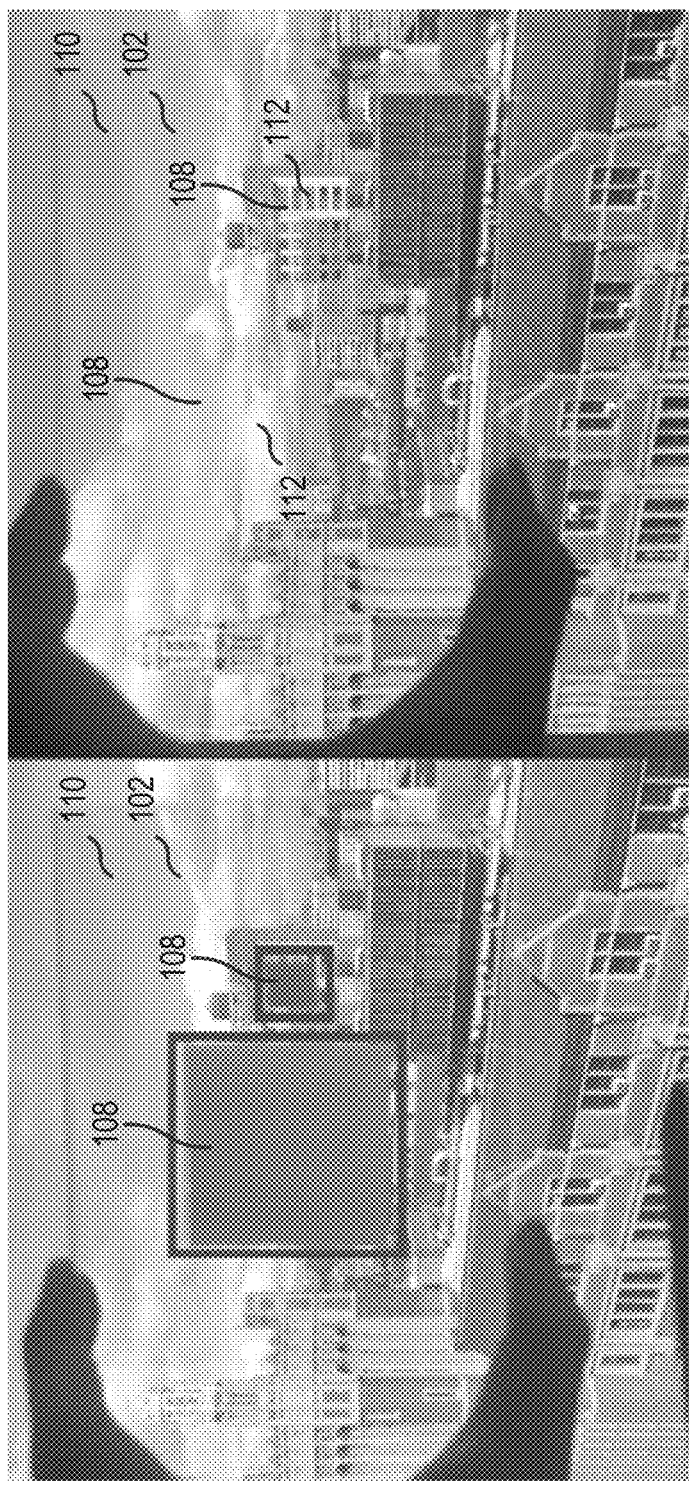
FIG. 3B is an image of a switchable light transmission module according to some embodiments of the present disclosure.
Figure 3C:
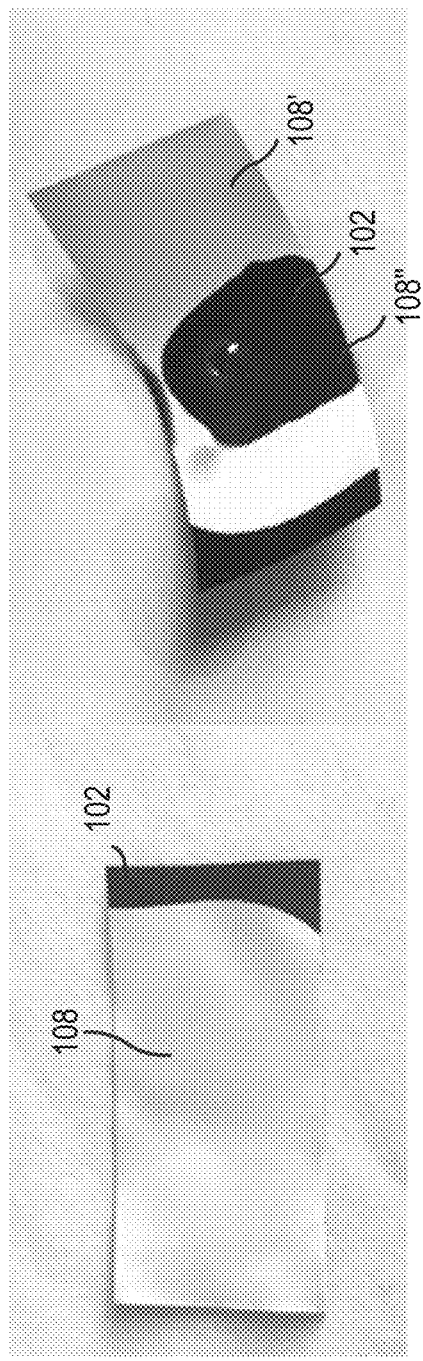
FIG. 3C is an image of a switchable light transmission module according to some embodiments of the present disclosure.

When in a dry state, the voids 202 in porous layer 108 are filled with air which has a much different refractive index than the porous layer itself. This results in significant scattering of light at the layer-air interface, and thus the film is reflective and not very transmissive. During wetting of porous layer 108 by fluid 112, however, voids 202 are filled with the fluid, reducing the difference in refractive index across the polymer-fluid interfaces. Depending on the choice of layer and fluid, this difference can be essentially zero. As a result, light scattering is drastically reduced, and the wetted porous layer 108 behaves as a continuous, glass-like medium that is transparent or highly translucent to light. Referring now to FIG. 3B, by way of example, a polymer layer 108 was sandwiched between two transparent plates (a cover and a substrate). Upon wetting with isopropanol, the layer was made essentially transparent. Upon removal of the fluid, followed by drying, the opacity of the film was restored. Referring now to FIG. 3C, again by way of example, a polymer layer 108 is provided on a black substrate 102. A portion of the polymer layer 108 is dry (108') while another portion of the layer is wetted (108") with isopropanol. As can be seen, the wetted layer 108" is transparent, so that the black substrate underneath is visible, while the dry layer 108' remains white and opaque, so that the substrate underneath is not visible. This process is completely reversible, and can be used to yield switchable transmission and reflection by a substrate. Such switchable transmission is highly useful in applications for controlling light and heat, such as smart windows or other building materials, where at some times of the day/year it is advantageous to have an opaque and/or reflective surface, while at other times of the day/year it is more advantageous to have a light-permeable surface.

Figure 4A:
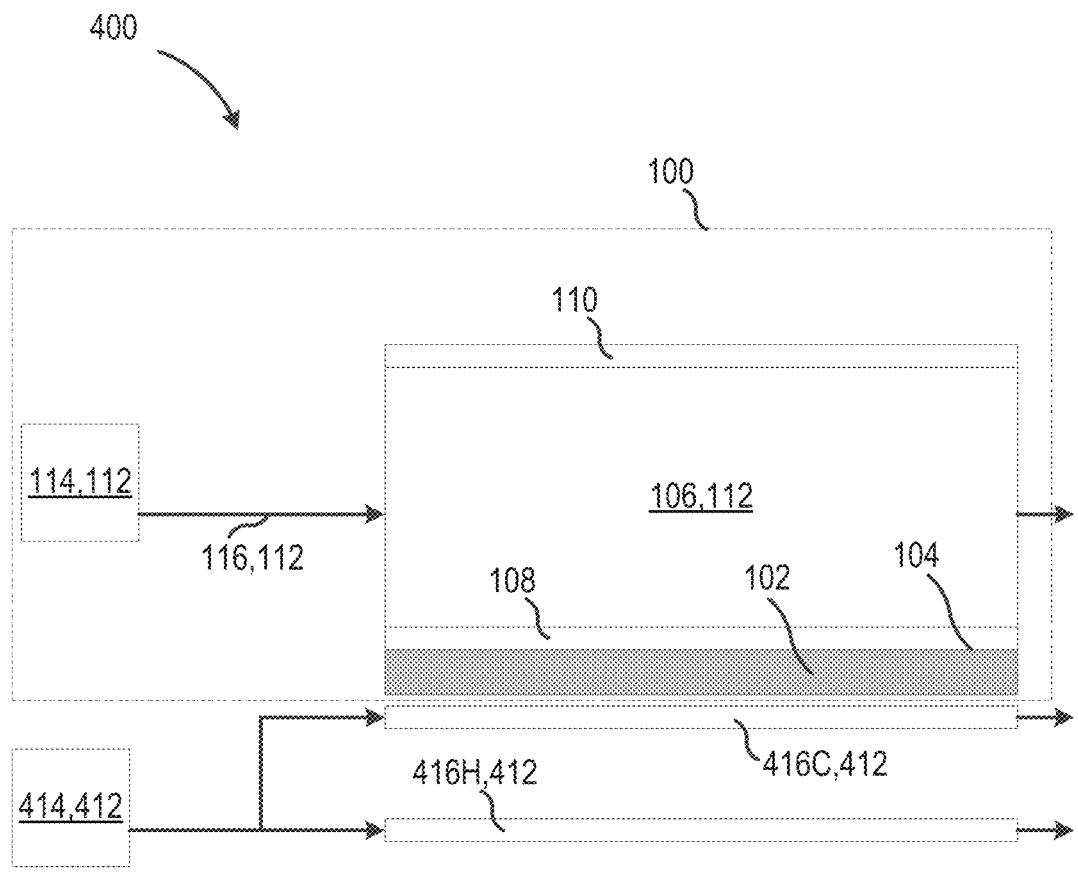
FIG. 4A is a schematic drawing of a heating and cooling system according to some embodiments of the present disclosure.

Referring now to FIG. 4A, some embodiments of the present disclosure are directed to fluid heating and cooling system 400 incorporating a light transmission module 100 consistent with some embodiments of the present disclosure as discussed above. In some embodiments, system 400 includes substrate 102 having a first light-permeable surface 104 defining at least part of an enclosed volume 106. A light-permeable cover 110 also defines at least part of enclosed volume 106. An opaque porous structured polymer layer 108 is disposed on first surface 104 and in fluid communication with enclosed volume 106. Reservoir 114 is in fluid communication with enclosed volume 106 and includes first fluid 112. As discussed above, first fluid 112 is able to wet but does not dissolve the opaque porous structured polymer layer 108. Further, in some embodiments, first fluid 112 has a refractive index that is within about 30% of the refractive index of layer 108. In some embodiments, first fluid 112 has a refractive index that is within about 15% of the refractive index of layer 108.

In some embodiments, system 400 includes a source 414 of a second fluid 412. In some embodiments, source 414 is in fluid communication with a cooling conduit 416C and a heating conduit 416H. In some embodiments, second fluid 412 is a fluid that a user desires to heat or cool, such as drinking water, etc. Cooling conduit 416C is proximate to opaque porous structured polymer layer 108. Heating conduit 416H is positioned to receive light transmitted through light transmission module 110, e.g., substrate 102. In some embodiments, air is disposed between cooling conduit 416C and heating conduit 416H.

Figure 4B:
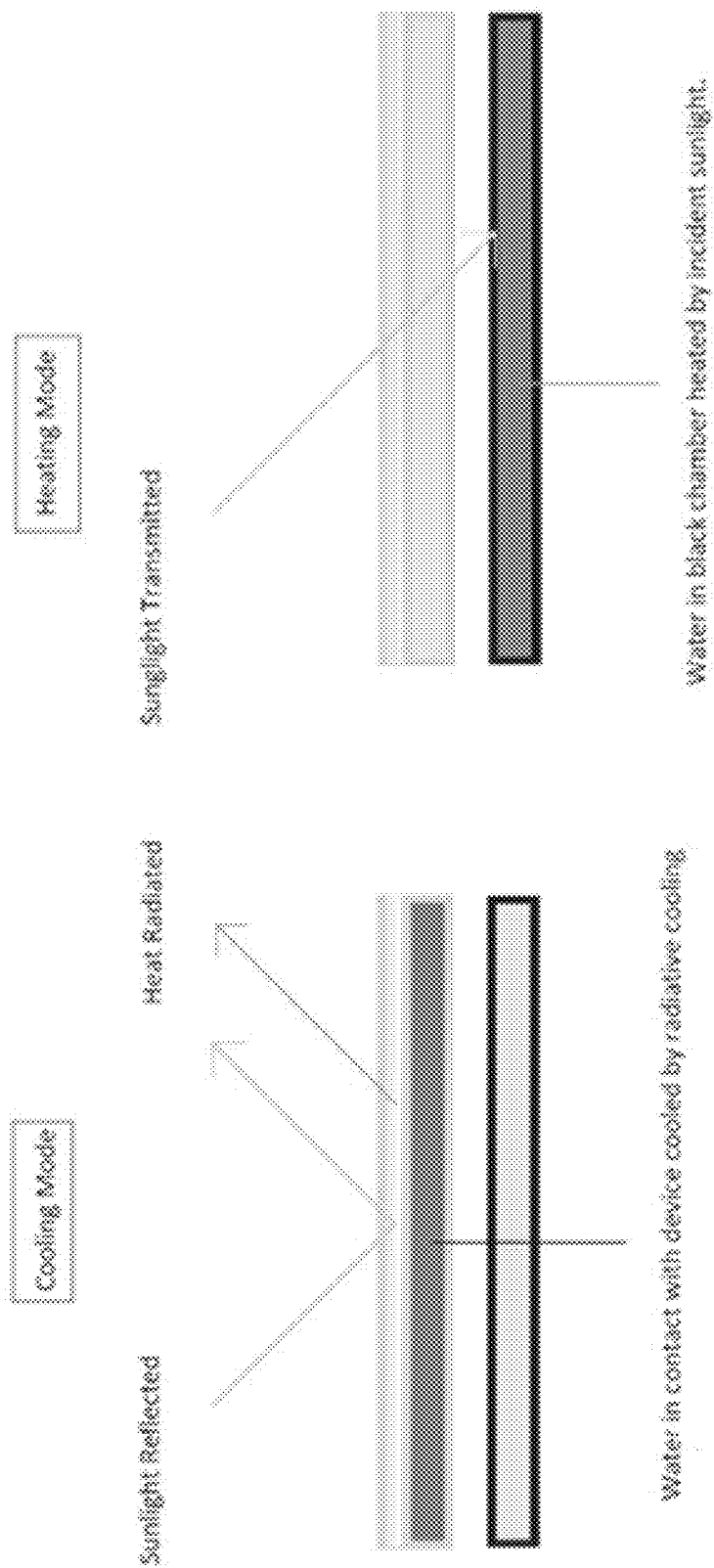
FIG. 4B is a schematic drawing of a heating and cooling system according to some embodiments of the present disclosure.

Referring now to FIG. 4B, as discussed above, when dry, polymer layer 108 is opaque and generally reflects sunlight and emits thermal radiation. As a result, radiative cooling can be harnessed on the side of substrate 102 opposing first light-permeable surface 104. Thus, by being proximate opaque porous structured polymer layer 108, second fluid 412 is radiatively cooled in cooling conduit 416C by light transmission module 100 while in "cooling mode," i.e., when polymer layer 108 is dry and reflects light. However, when in "heating mode," polymer layer 108 is wetted by fluid 112, allowing light to pass through it and substrate 102 to heat second fluid 412 in heating conduit 416H. In some embodiments, heating conduit 416H is configured to maximize transmission of heat energy to second fluid 412 from light transmitted through substrate 102 and/or incident thereon, e.g., by including one or more dark surfaces to absorb the light.

Figure 5:
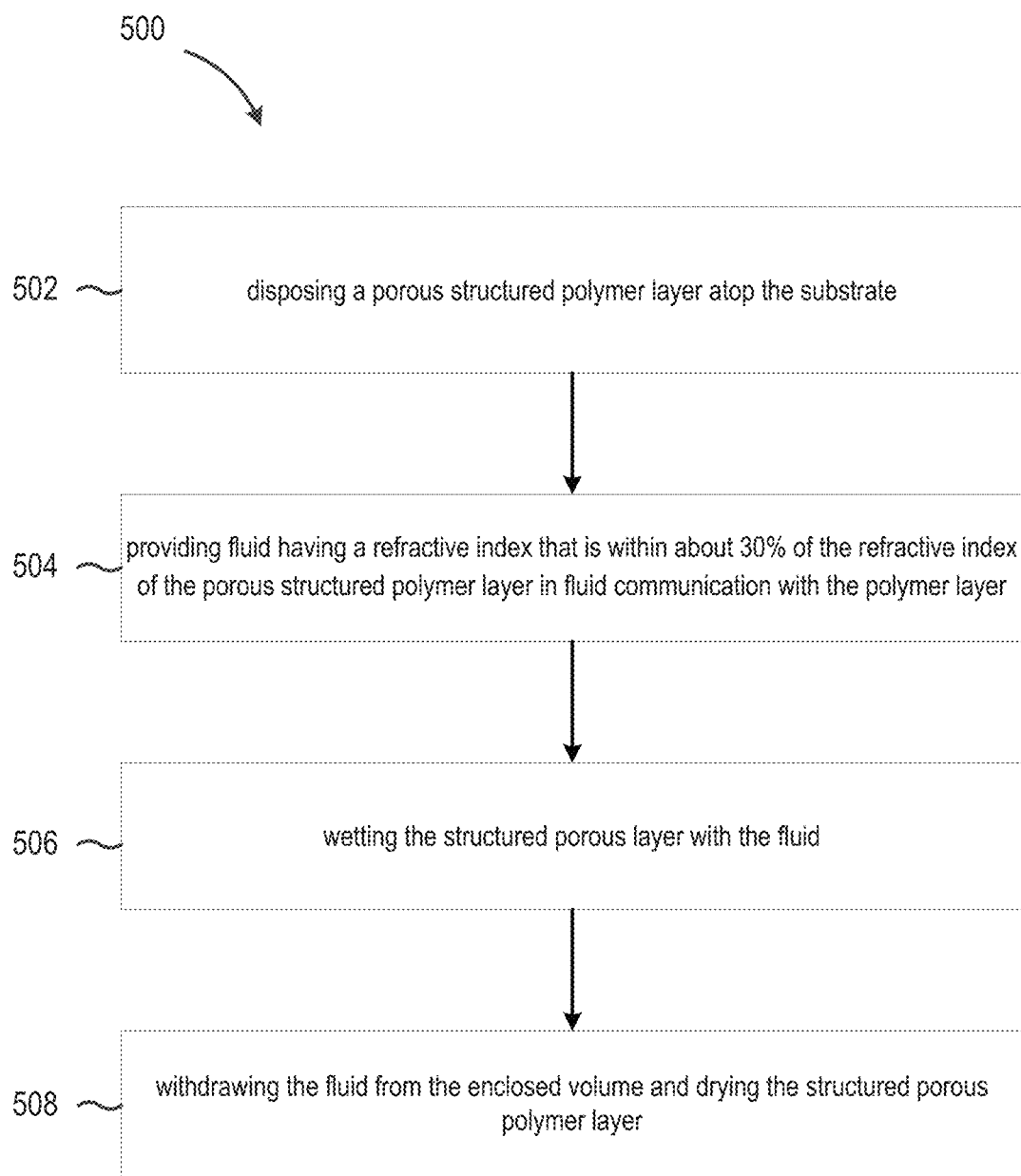
FIG. 5 is a chart of a method for controlling the transmission of light to a substrate according to some embodiments of the present disclosure

Referring now to FIG. 5, some embodiments of the present disclosure are directed to a method 500 for controlling the transmission of light to a substrate. In some embodiments, at 502, the method includes disposing a porous structured polymer layer atop the substrate. At 504, fluid having a refractive index that is within about 30% of the refractive index of the porous structured polymer layer is provided in fluid communication with the polymer layer. At 506, the porous layer is wetted with the fluid. As discussed above, wetting of the porous layer by the fluid fills voids in the layer, reducing the difference in refractive index across the polymer-fluid interfaces. Depending on the choice of layer and fluid, this difference can be essentially zero. As a result, light scattering is drastically reduced, and the wetted porous layer behaves as a continuous, glass-like medium that is transparent or highly translucent to light. In some embodiments, at 508, fluid is withdrawn from the enclosed volume and the polymer layer is dried. As discussed above, upon removal of the fluid, followed by drying, the opacity of the layer is restored. This process is completely reversible, and can be used to yield switchable transmission and reflection by the polymer layer.

Figure 6:
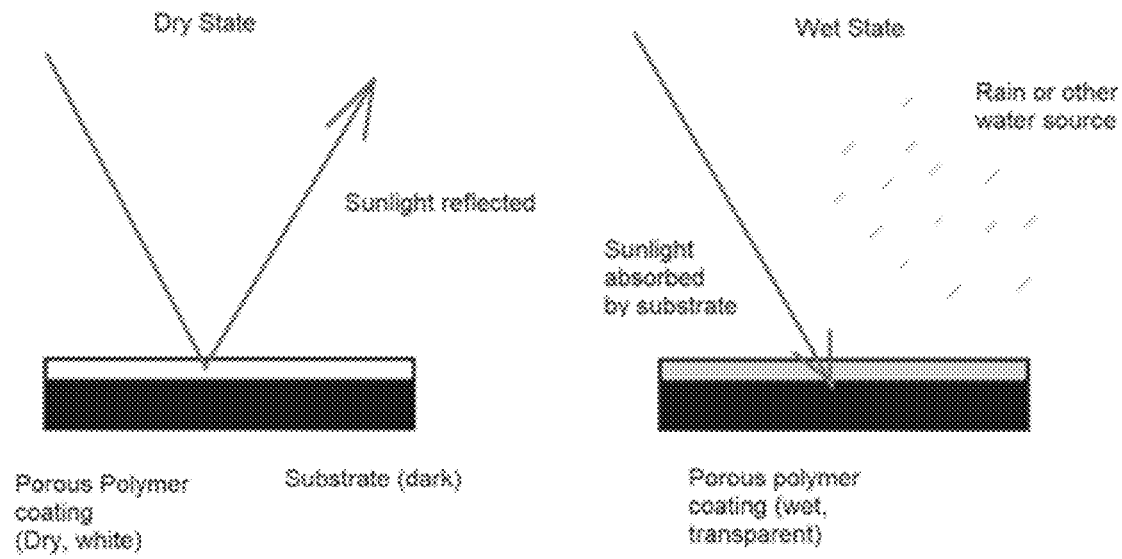
FIG. 6 is a schematic drawing of a switchable light transmission module according to some embodiments of the present disclosure.

Referring now to FIG. 6, some embodiments of the present disclosure include a porous structured polymer layer atop a dark or transparent substrate, and otherwise exposed to the environment. In such a configuration, the structured polymer can be hydrophilic but insoluble in water, and as mentioned above, white or opaque in the dry state. Upon wetting by water in the environment, e.g., rain, seawater or freshwater, the coating can turn transparent or translucent by the same mechanism as described above, to reveal the dark or transparent substrate underneath. This can be used in water-responsive exterior coatings, water sensing systems or underwater camouflaging.

Figure 7:
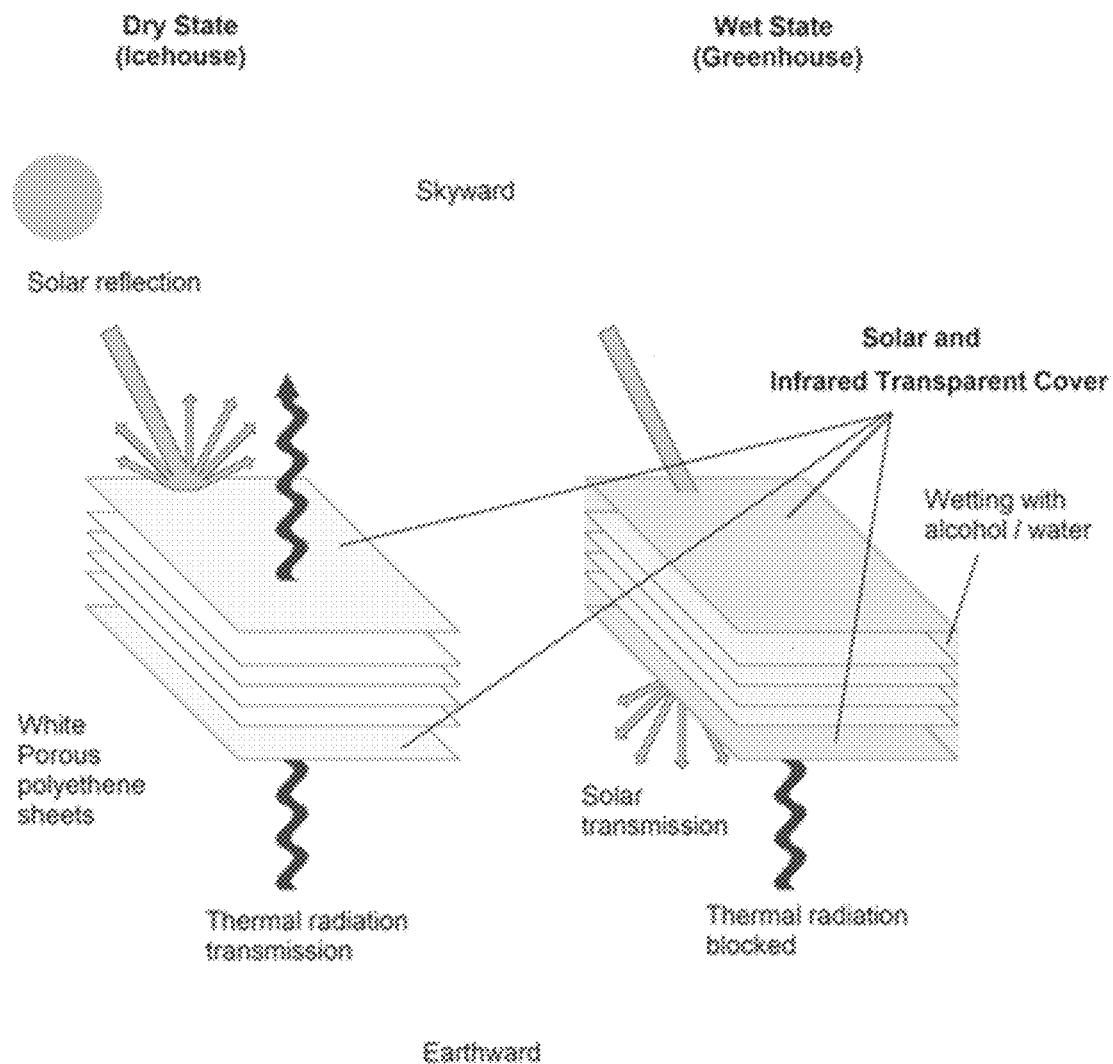
FIG. 7 is a schematic drawing of a switchable light transmission module according to some embodiments of the present disclosure.

Referring now to FIG. 7, some embodiments of the present disclosure include a switchable transmission module containing a porous polymer that is reflective or opaque to solar wavelengths (0.35 to 2.5 micrometers), and transparent in the thermal wavelengths (2.5 to 40 micrometers). The substrate, the cover and other enclosing surfaces of the module are chosen to be such that they are transparent across at least one or more regions of the solar-to-thermal wavelengths (0.35 to 40 micrometers). The fluid used for wetting is chosen to have a refractive index that is within 15% of that of the porous polymer in the solar wavelengths and to be emissive or absorptive the thermal wavelengths. In some embodiments, upon wetting, the module switches from solar reflective, thermally transparent state to solar transparent, thermally opaque state. In the example shown, the module transmits thermal radiation and reflects sunlight, leading to an ice-house like behavior. Upon wetting, the module changes to a solar-transparent, infrared opaque state, exhibiting a similar behavior to greenhouses. In addition to controlling light and heat, this can also be used in thermal camouflage.

Figure 8A:
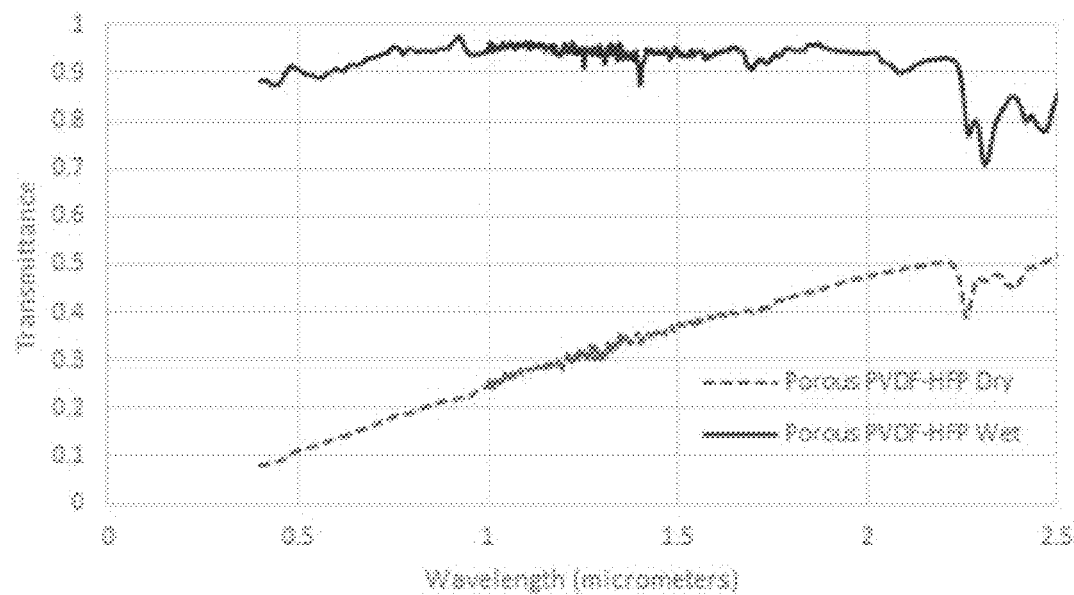
FIG. 8A is a graph showing the switchable optical transmission spectra of a switchable light transmission module according to some embodiments of the present disclosure.
Figure 8B:
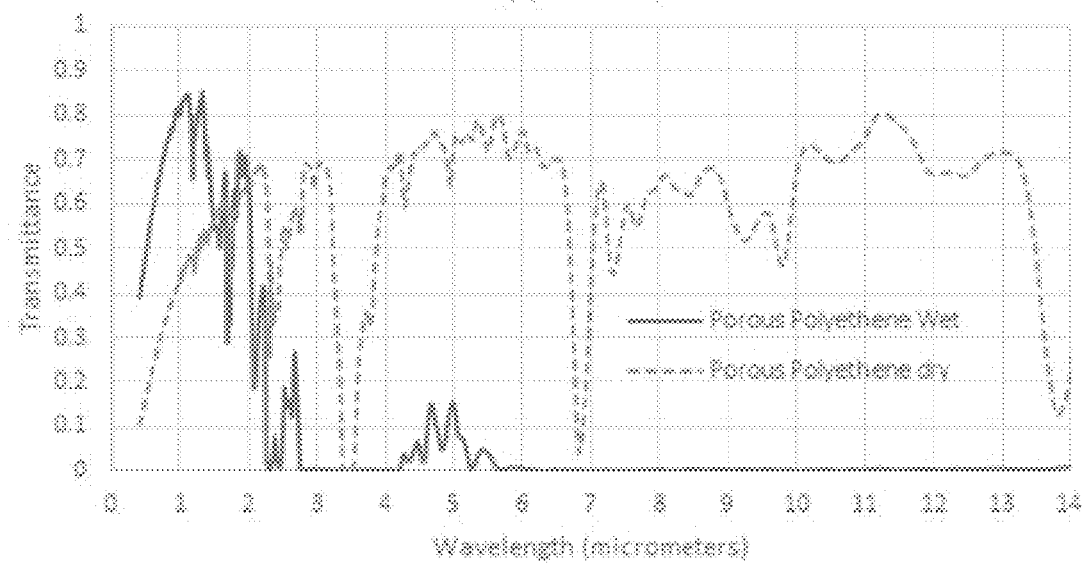
FIG. 8B is a graph showing the switchable optical transmission spectra of a switchable light transmission module according to some embodiments of the present disclosure.

Referring now to FIGS. 8A-8B, the switchable optical transmittance in the solar wavelengths was demonstrated at for a module containing a porous poly(vinylidene difluoride-co-hexafluoropropene) coating. As shown, the solar transmittance (~1−Reflectance) is low for the dry state but high (>90%) for the wet state. Additionally, switchable solar-to-thermal transmittance was demonstrated for a transparent poly(ethene) module containing porous poly(ethene) layers. As shown, upon wetting, the module changes from solar-reflective and infrared transparent state to a solar-translucent, infrared blocking state.

Methods of the present disclosure advantageously provide a porous polymer layer that can be deposited on wide variety of substrates and has a microstructure with a white, colored, opaque appearance when dry, and that transmits solar wavelengths when wetted with a fluid having a similar refractive index. The process is reversible, as upon drying of the layer, the opacity of the layer is restored. The systems of the present disclosure utilize fluids that have high wettability for the polymer layer, yet do not dissolve the polymer. With inclusion of the polymer layers, the systems of the present disclosure thus yield switchable transmission/reflection substrates having applications in smart windows, energy technology, and smart displays. These substrates can be manufactured at lower cost than previously demonstrated, yet provide higher performance and an eco-friendlier alternative to those previous demonstrations. Systems and methods of the present disclosure also avoid the necessity of electrical switching methods as found in currently-available technologies.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A switchable light transmission module, comprising:
a substrate having a first surface defining at least part of an enclosed volume;
a porous layer disposed on the first surface and in fluid communication with the enclosed volume; and
a reservoir in fluid communication with the enclosed volume and including a non-dissolving fluid;
the reservoir being configured to supply the fluid to the enclosed volume such that the fluid contacts the porous layer, wherein the porous layer is wetted when the fluid is in the enclosed volume, and is dried when the fluid is in the reservoir,
wherein the fluid has a refractive index that is within about 30% of the refractive index of the porous layer.

2. The module according to claim 1, wherein the reservoir is further configured to accept fluid from the enclosed volume.

3. The module according to claim 1, wherein the fluid has a refractive index that is within about 15% of the refractive index of the porous layer.

4. The module according to claim 1, wherein the substrate has a color that is darker than the color of the porous layer.

5. The module according to claim 1, wherein the porous layer includes a structured polymer, the structured polymer including poly(vinylidene difluoride), poly(vinylidene difluoride-co-hexafluoropropene), poly(methyl methacrylate), poly(vinyl chloride), poly(vinyl fluoride), poly(styrene), poly(dimethyl siloxane), cellulose acetate, ethyl cellulose, poly(ethene), poly(propene), or combinations thereof.

6. The module according to claim 5, wherein the porous layer includes a plurality of voids disposed therein, the plurality of voids having cross-sectional dimensions of less than 2 micrometers.

7. The module according to claim 5, wherein the porous layer includes a plurality of voids disposed therein, the plurality of voids having cross-sectional dimensions between 3 micrometers to 20 micrometers.

8. The module according to claim 1, wherein the substrate includes building materials, glass, plastic, metal, textile, a window, a skylight, siding, roofing, decking, or combinations thereof.

9. The module according to claim 1, wherein the substrate is light-permeable.

10. The module according to claim 1, further comprising a light-permeable cover defining at least part of the enclosed volume.

11. The module according to claim 1, wherein the fluid is an alcohol, ethanol, isopropanol, glycerol, water, salt solution, or combinations thereof.

12. The module according to claim 1, wherein the porous layer is not in electrical communication with one or more electrodes.

13. The module according to claim 1, wherein fluid volume in the enclosed volume is reduced when the fluid is in the reservoir.

14. A method for controlling the transmission of light to a substrate, the method comprising:
    disposing a porous structured polymer layer atop a substrate, the substrate having
    a first surface defining at least part of an enclosed volume;
    providing fluid having a refractive index that is within about 30% of the refractive index of the porous structured polymer layer in fluid communication with the porous structured polymer layer;
    wetting the porous structured polymer layer with the fluid;
    withdrawing the fluid from the enclosed volume to a reservoir separate from the enclosed volume; and
    drying the porous structured polymer layer as the fluid is withdrawn from the enclosed volume.

15. The method according to claim 14, wherein the fluid has a refractive index that is within about 15% of the refractive index of the porous structured polymer layer.

16. The method according to claim 14, wherein the porous structured polymer layer has a hemispherical reflectance of from 50% to 99% for radiation having a wavelength from 0.35 to 2.5 micrometers, a hemispherical thermal emittance of at least 75% for radiation having a wavelength from about 8 to about 13 micrometers, or combinations thereof.

17. The method according to claim 14, wherein the porous structured polymer layer includes poly(vinylidene difluoride), poly(vinylidene difluoride-co-hexafluoropropene), poly(methyl methacrylate), poly(vinyl chloride), poly(vinyl fluoride), poly(styrene), poly(dimethyl siloxane), cellulose acetate, ethyl cellulose, poly(ethene), poly(propene), or combinations thereof.

18. The method according to claim 14, wherein the fluid is an alcohol, ethanol, isopropanol, glycerol, water, salt solution or combinations thereof.

19. The method according to claim 14, wherein the substrate includes building materials, glass, plastic, metal, textile, a window, a skylight, siding, roofing, decking, or combinations thereof.

20. A fluid heating and cooling system comprising:
    a substrate having a first light-permeable surface defining at least part of an enclosed volume;
    an opaque porous structured polymer layer disposed on the first light-permeable surface and in fluid communication with the enclosed volume;
    a reservoir in fluid communication with the enclosed volume and including a first fluid, the first fluid being able to wet but not dissolve the opaque porous structured polymer layer, and dry the porous structured layer when the fluid is withdrawn in the reservoir; and
    a source of a second fluid in fluid communication with a cooling conduit and a heating conduit;
    wherein the reservoir being configured to supply the first fluid to the enclosed volume such that the first fluid contacts the opaque porous structured polymer layer, the first fluid has a refractive index that is within about 15% of the refractive index of the opaque porous structured polymer layer, the cooling conduit is proximate to the opaque porous structured polymer layer, and the heating conduit is positioned to receive light transmitted through the substrate.

* * * * *